June 21, 1938.   H. T. KRAFT   2,121,740
SKID PREVENTING DEVICE FOR USE WITH VEHICLE TIRES
Filed Jan. 2, 1936
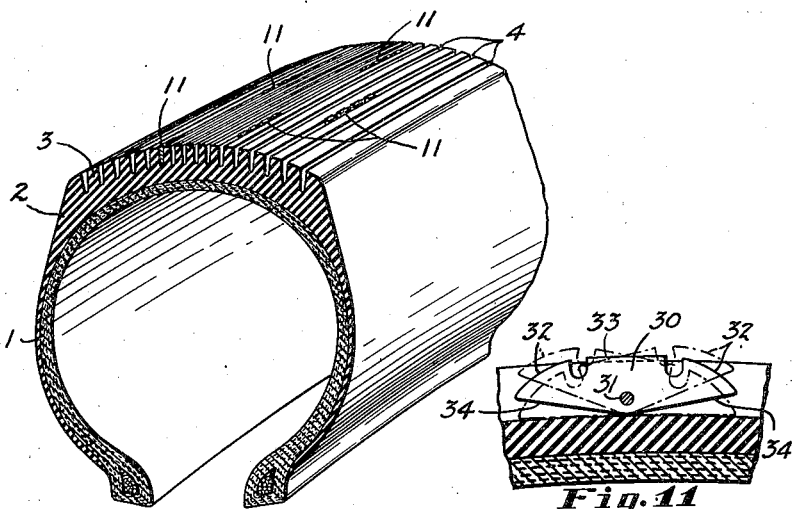
Fig. 1
Fig. 11
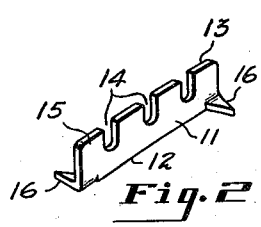
Fig. 2
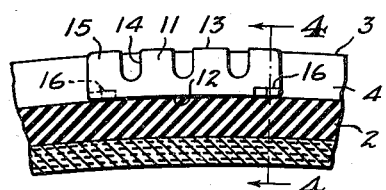
Fig. 3
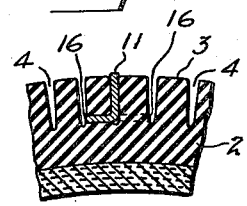
Fig. 4
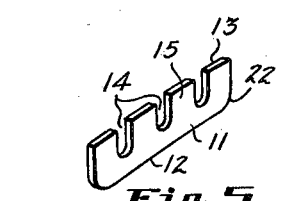
Fig. 5
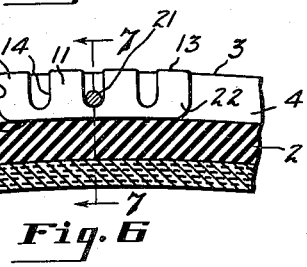
Fig. 6
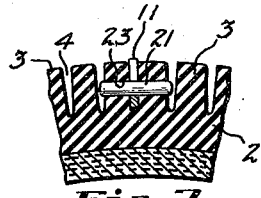
Fig. 7
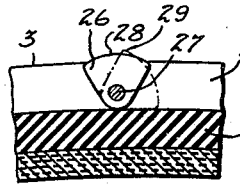
Fig. 10
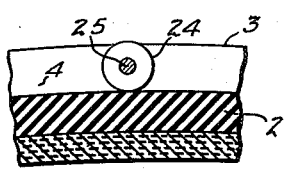
Fig. 9
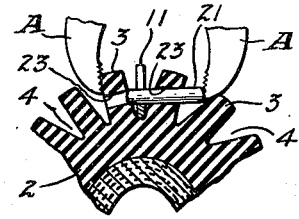
Fig. 8
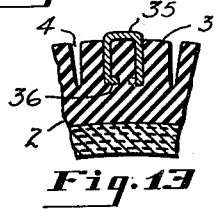
Fig. 13
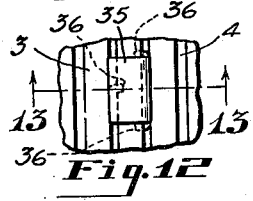
Fig. 12
INVENTOR
*Herman T. Kraft*
BY *Evans & McCoy*
ATTORNEYS Patented June 21, 1938

2,121,740

UNITED STATES PATENT OFFICE 2,121,740

SKID-PREVENTING DEVICE FOR USE WITH VEHICLE TIRES

Herman T. Kraft, Akron, Ohio, assignor to The General Tire & Rubber Company, Akron, Ohio, a corporation of Ohio Application January 2, 1936, Serial No. 57,177

11 Claims. (Cl. 152—210)

This invention relates to skid-preventing devices for use with vehicle tires and has for one of its objects the provision of vehicle tires with new and novel skid preventing devices which are light in weight, simple in construction and economical to manufacture.

Another object is to provide a vehicle tire with skid-preventing devices of such construction that they may be easily assembled to the tire tread, and, yet, will neither impair the original resiliency and pliability of the tire, nor impair the operation of or injure the tire at high vehicle speeds on dry road surfaces.

Another object is to provide skid-preventing devices for vehicle tires which do not materially add to the weight of the tire and which may be readily attached to and detached from the tire.

Another object is to provide a vehicle tire with new and improved skid-preventing devices which are carried by the tire tread and yet will not interfere with the riding qualities of the tire.

A further object is to provide a skid-preventing device of the character specified which may be left intact in the tire tread even though its use is not required, without causing excessive wear of either the tire or the device itself.

With the above and other objects in view, the present invention consists of certain features of construction and combinations of parts to be hereinafter described with reference to the accompanying drawing and then claimed.

In the drawing, which illustrates suitable embodiments of the invention,

Figure 1 is a fragmentary perspective view, in section, of a vehicle tire showing one form of the skid-preventing device of the present invention, assembled thereto;

Fig. 2 is a perspective view of one form of the skid-preventing device of the present invention;

Fig. 3 is a fragmentary section taken through a vehicle tire showing the device of Fig. 2 in side elevation when assembled thereto;

Fig. 4 is a transverse section taken substantially on line 4—4 of Fig. 3;

Fig. 5 is a perspective view of another form of the invention;

Fig. 6 is a sectional view of a tire similar to Fig. 3 showing the device of Fig. 5 in operative position;

Fig. 7 is a transverse section taken substantially on line 7—7 of Fig. 6;

Fig. 8 is a transverse section showing the manner of mounting the device of Fig. 5 in position;

Fig. 9 is a sectional view of a tire similar to Fig. 3 showing a modified form of the device assembled thereto;

Fig. 10 is a sectional view of a tire similar to Fig. 3 showing another form of the invention;

Fig. 11 is a view similar to Fig. 6 showing a slightly modified form of the invention;

Fig. 12 is a sectional view showing a further modified form of the invention; and Fig. 13 is a section taken approximately on line 13—13 of Fig. 12.

Referring to the accompanying drawing in which like numerals refer to like parts throughout the several views, the skid-preventing devices of the present invention are particularly adaptable to vehicle tires of the general type disclosed in my co-pending application Serial No. 754,104, filed Nov. 21, 1934, and such as the tire 1, shown in Fig. 1, having a tread 2 comprised of relatively narrow, circumferentially extending, flexible ribs 3, axially spaced by narrow grooves 4. However, it is to be understood that the devices about to be described, are also adaptable for use with any tire tread having circumferentially arranged grooves extending either partially or completely around the tire tread.

Broadly stated, the present invention resides in providing a plurality of flat elements of hard, wear-resisting material, preferably of high carbon or plow steel or a metal known to the trade as "Stellite", inserted at spaced and preferably staggered intervals between spaced radial surfaces of the vehicle tire tread, preferably parallel to the median plane thereof, and mechanically anchored in position. These elements are so arranged that they will engage the road surface during tread engagement with the road surface, and present sharp edges which will, upon tendency of the vehicle to skid either sideways or in the direction of travel of the vehicle, effectively prevent or minimize skidding and slipping, particularly on wet or icy road surfaces.

The skid-preventing elements described, being relatively narrow and spaced apart at circumferential and transverse intervals, as shown in Fig. 1, will not impair the resiliency and pliability of the tire tread and will not injure the tire tread, even when the vehicle is operated at high speeds over dry pavements.

The skid-preventing or resisting elements described are preferably assembled to the tire in such a manner that the road engaging surfaces thereof project slightly radially beyond the tread surface, as shown in the drawing.

Also, these elements may assume several different forms, some of which are shown in the drawing, and may be anchored in different manners.

In the form shown in Figs. 2, 3, and 4, each skid-preventing element 11 is narrow and of generally rectangular shape and is provided with a base edge 12 conforming to the curvature of the bottom of the tread groove 4, and a road-engaging edge 13 conforming to the curvature of the road-engaging surface of the tire tread to which it is to be applied.

If desired, the element 11 may be provided with notches 14 in its edge 13 to form a number of spaced road-engaging portions or lugs 15.

In the form shown in Fig. 2, the element 11 is provided with laterally extending sharp-pointed projections 16, one of which extends from one side of the element 11 at one end, and the other of which extends from the opposite thereof at the other end.

While the elements 11 of the type shown in Fig. 2 may be assembled to an inflated tire in place on a wheel, it is preferred to have the tire in a deflated condition and removed from the wheel so that the sides adjacent the tread may be moved toward each other in the manner shown in Fig. 8, to separate the ribs 3.

Before assembling the element 11 to the tire, the element is first heated to approximately 400° F. in any suitable manner. Then by inserting a suitable tool such as a screwdriver between adjacent separated ribs 3 of the tire, the ribs are distorted and further separated a sufficient distance to permit the heated element to be disposed by means of pincers or any suitable tool, in the groove between the ribs and against the bottom of the groove. Upon allowing the tire to assume its normal shape, the projections 16, since the element is heated to approximately 400° F., will pierce the ribs 3 and become anchored therein.

Any desired number of the elements 11 may be disposed between desired pairs of ribs 3 in any suitable spacing arrangement, and in the construction just described the elements 11 become substantially permanently anchored in position, due to the action of the heated element on the rubber of the tread body.

The skid-preventing element shown in Figs. 5, 6, and 7 is similar to the construction shown in Figs. 2, 3, and 4, with the exception of the manner of mounting, and for this reason corresponding portions carry the same numerals.

The anchoring projections are omitted in the element of Fig. 5, and the corners of the element 11 are preferably rounded, as shown at 22 in Figs. 5 and 6, to prevent gouging of the bottom of the groove within which the element 11 is mounted, because the element is held in place solely by a pin 21 fitting within the central notch 14 and having its ends projecting into apertures 23 formed in the adjacent ribs 3. In this mounting, the pin 21 seats against the bottom of the intermediate notch 14 and holds the edge 12 against the bottom of the groove 4.

The apertures 23 are formed in the adjacent ribs 3, between which the element 11 is to be disposed, by separating the ribs in any suitable manner, and piercing the two ribs in question with a sharp-pointed instrument, which is heated to a sufficient temperature to form the apertures by burning.

In order to assemble the element 11 of Fig. 5 to the tire, the ribs 3 are separated to a position such as shown in Fig. 8, and the element 11 is positioned in the bottom of the groove 4 between the two ribs and with the intermediate notch 14 in alignment with the apertures 23. Then, the pin 21 is forced through the aperture 23 of one of the ribs 3, and caused by means of the jaws A of a pair of pincers, or by any other suitable means, which is capable of distorting the other rib, to be extended through the notch 14 and into the aperture of the last mentioned rib.

Upon the tire assuming its normal shape, the element 11 is gripped between the adjacent ribs 3, as shown in Fig. 7.

In the modified form of the invention shown in Fig. 9, the skid-preventing element is in the form of a metal washer 24, which is pivotally held in place by means of a pin 25 mounted in the same manner as the pin 21 shown in Figs. 6 and 7.

In the modified form of the invention shown in Fig. 10, the skid-preventing element is in the form of a segment 26, the apex of which is substantially in abutting engagement with the bottom of the groove 4, and pivotally mounted by means of a pin 27 extending through the apex and having its ends supported by the ribs in the same manner as the pin 21 shown in Fig. 7.

At high speed operation, the segment or triangularly shaped element 26, will assume the position shown in solid outline in Fig. 10, by reason of centrifugal force, the arcuate edge 28 forming the road-contacting surface. When, however, there is a tendency to skid, the element 26 pivots to the position shown in dotted outline in Fig. 10, in which position the sharp corner 29 engages the road surface and effectively reduces the tendency of the tire to skid.

The construction shown in Fig. 11 is somewhat similar to the construction shown in Fig. 6, and comprises a flat element 30, which is pivotally mounted on a pin 31 mounted in the same manner as the pin 21 of Fig. 7. The end portions 32 of the road-engaging edge 33 are rounded as shown. The opposite edge comprises two surfaces 34 which diverge from the end terminations of the rounded portions 32 to a point intermediate the ends of the element 30.

In operation, the element 30 is free to pivot during rotation of the tire upon the road surface from the position shown in solid outline to one of the positions shown in dotted outline. Driving rocks it in one direction and braking in the other.

In each of the constructions shown in Figs. 6, 9, 10, and 11, the particular elements described may be readily detached when they are no longer needed, such as at the end of the winter season, by distorting the tread to separate the ribs 3 and removing the supporting pins.

In the construction shown in Fig. 9, the element 24 is free to rotate and thereby present a continuously changing road-engaging surface.

The skid-preventing device shown in Figs. 12 and 13, comprises a U-shaped element 35 of metal, the inner surfaces of the legs thereof having small projections 36 thereon. The tire is distorted as in Fig. 8 to separate the ribs 3 and the element 36 in slightly expanded form and preferably heated to approximately 400° F. is slipped over the desired rib 3, and then the legs thereof are clamped or clinched against the sides of the rib with sufficient pressure to force the projections 36 into the rib. The junctions of the legs with the base of the element 36 are preferably square cornered so that sharp edges are provided. This modification of the invention is more fully described in my co-pending patent application Serial No. 76,144, filed April 24, 1936, now Patent No. 2,117,766.

It will be observed from the drawing and foregoing description that I have provided a new and improved means for use with vehicle tires for preventing and minimizing skidding.

In each of the forms described any desired number of the elements may be assembled to the tire in any desired spaced and staggered relation to provide narrow sharp cornered friction members which during operation of the tire over icy road surfaces will actually dig into the icy surface and obviously reduce the tendency of the tire to skid. Also, when the tire is operated over wet pavements, the tendency of the tire to skid is opposed by the high coefficient of friction resulting from the contact of the skid-preventing element with the road surface. Also, during the tendency of the tire to skid, the ribs 3 flex and cause the corners of the skid-preventing elements to be presented to the road surface.

Because of the fact that the skid-preventing elements are relatively narrow as compared with the width of the tire tread and are spaced transversely as well as circumferentially, they will not interfere with the operation of or impair the resiliency or pliability of the tread and thus will not detract from the riding qualities of the tire tread.

Although several embodiments of the invention have been herein shown and described it will be understood that numerous modifications of the construction shown may be resorted to without departing from the spirit of this invention as defined in the appended claims.

What I claim is:

1. In a vehicle tire having a series of parallel, narrow, circumferential grooves in the tread portion thereof provided with opposed radial walls, said grooves being closely spaced and providing laterally flexible circumferential ribs between them, independently mounted skid-preventing elements radially disposed in and spaced laterally and circumferentially in the tread portion of said grooves, each of said elements comprising a flat member of hard, wear-resisting material having abutting engagement with said radial walls, and having an edge abutting the bottom of the groove within which the element is disposed, and means for anchoring said elements to contiguous flexible ribs, said elements being spaced laterally and circumferentially in the tread portion so that the portions of the ribs to which said elements are attached may flex laterally.

2. In a vehicle tire having spaced, circumferentially arranged, narrow grooves in the tread portion thereof provided with opposed radial walls, a plurality of skid-preventing elements radially disposed in spaced relation in one or more of said grooves, each of said elements comprising a flat member of hard, wear-resisting material having abutting engagement with said radial walls and having lateral projecting portions extending into said side walls near the bottom of the groove formed thereby to anchor the element in position.

3. In a vehicle tire having spaced, circumferentially arranged, narrow grooves in the tread portion thereof provided with opposed radial walls, a plurality of skid-preventing elements radially disposed in spaced relation in one or more of said grooves, each of said elements comprising a flat member of hard, wear-resisting material having abutting engagement with said radial walls and having a lateral projecting portion at each end, one being at one side of the element and the other being at the opposite side of the element, said projecting portions extending into the adjacent side walls to anchor the element in position.

4. In a vehicle tire having a series of parallel, narrow, circumferential grooves in the tread portion thereof provided with opposed radial walls, independently mounted skid-preventing elements radially disposed in and spaced laterally and circumferentially in the tread portion of said grooves, each of said elements comprising a flat elongated member of hard, wear-resisting material of a thickness to substantially fit in a groove and of a height substantially equal to the groove depth, the outer edge of said member having a plurality of spaced notches extending inwardly from said edge, and means for anchoring each of said elements in position with its inner edge engaging the bottom of a groove and the portions of its outer edge intermediate the notches substantially flush with the tread surface.

5. In a vehicle tire having spaced, circumferentially arranged, narrow grooves in the tread portion thereof provided with opposed radial walls, a plurality of skid-preventing elements radially disposed in spaced relation in one or more of said grooves, each of said elements comprising a flat elongated member of hard, wear-resisting material having substantially abutting engagement with the said radial walls and the bottom of the groove within which the element is disposed and having a road-engageable edge disposed at the road-engaging surface of said tread portion, said member having a plurality of notches extending inwardly from said edge, said side walls having aligned apertures therein, and a pin member disposed in one of said notches and having its ends disposed in said apertures for holding said element in position.

6. In a vehicle tire having spaced, circumferentially arranged, narrow grooves in the tread portion thereof provided with opposed radial walls, a plurality of skid-preventing elements radially disposed in spaced relation in one or more of said grooves, each of said elements comprising a flat elongated member of hard, wear-resisting material having substantially abutting engagement with the said radial walls and the bottom of the groove within which the element is disposed and having a road-engageable edge disposed at the road-engaging surface of said tread portion, said member having a plurality of notches extending inwardly from said edge and a central opening therein, said side walls having aligned apertures therein, and a pin member extending through said opening and having its ends disposed in said apertures.

7. In a vehicle tire having spaced, circumferentially arranged, narrow grooves in the tread portion thereof provided with opposed radial walls, a plurality of skid-preventing elements radially disposed in spaced relation in one or more of said grooves, each of said elements comprising a flat elongated member of hard, wear-resisting material having substantially abutting engagement with the said radial walls and the bottom of the groove within which the element is disposed and having a road-engageable edge disposed at the road-engaging surface of said tread portion, and means for anchoring each of said elements in position, said member being pivotally anchored, said road-engageable edge having its ends rounded, and the opposite edge of said member comprising two surfaces disposed at an angle to each other and intersecting each other intermediate the ends of said member, whereby one or the other of said surfaces may engage with the bottom of the groove within which the element is positioned.

8. In a vehicle tire having spaced, circumferentially arranged, narrow grooves in the tread portion thereof provided with opposed radial walls, a plurality of skid-preventing elements radially disposed in spaced relation in one or more of said grooves, each of said elements comprising a flat elongated member of hard, wear-resisting material having substantially abutting engagement with the said radial walls and the bottom of the groove within which the element is disposed and having a road-engageable edge disposed at the road-engaging surface of said tread portion, and means for anchoring each of said elements in position, said member being pivotally anchored, said road-engageable edge having its ends rounded, and the opposite edge of said member comprising two surfaces disposed at an angle to each other and intersecting each other intermediate the ends of said member, whereby one or the other of said surfaces may engage with the bottom of the groove within which the element is positioned, said road-engageable edge having notches therein.

9. In a vehicle tire having spaced, circumferentially arranged, narrow grooves in the tread portion thereof provided with opposed radial walls, a plurality of skid-preventing elements radially disposed in spaced relation in one or more of said grooves, each of said elements comprising a flat member of hard, wear-resisting material having abutting engagement with said radial walls, each said element being of triangular shape having its apex disposed adjacent the bottom of the groove within which it is disposed adjacent the bottom of the groove within which it is disposed, the edge of said element opposite said apex being arcuate in shape, and means for pivotally anchoring said element in its groove.

10. In a vehicle tire having spaced, circumferentially arranged, narrow grooves in the tread portion thereof provided with opposed radial walls, a plurality of skid-preventing elements radially disposed in spaced relation in one or more of said grooves, each of said elements comprising a flat member of hard, wear-resisting material having abutting engagement with said radial walls, each said element being of triangular shape having its apex disposed adjacent the bottom of the groove within which it is disposed, the edge of said element opposite said apex being arcuate in shape, said element having an opening through its apex, said radial walls having aligned apertures therein, and a pin member extending through said opening and having its ends disposed in said apertures for pivotally anchoring said element.

11. A vehicle tire having a tread provided with a series of independent flexibly supported ground engaging elements of hard wear resistant material spaced laterally and circumferentially with respect to one another on the tread, and means for flexibly supporting said elements on the tread comprising laterally flexible integral ribs on the tread and means for attaching said elements to said ribs.

HERMAN T. KRAFT.